July 25, 1961   R. GOTTSCHALD   2,993,717
BALL AND SOCKET JOINTS
Filed Oct. 17, 1958

Inventor
RUDOLF GOTTSCHALD

BY Robert H. Jacob
AGENT 2,993,717
BALL AND SOCKET JOINTS
Rudolf Gottschald, Osterrath, near Dusseldorf, Germany, assignor to A. Ehrenreich & Cie., Dusseldorf-Oberkassel, Germany
Filed Oct. 17, 1958, Ser. No. 767,926
Claims priority, application Germany Oct. 17, 1957
2 Claims. (Cl. 287—90)

The invention relates to a ball and socket joint in which the ball is disposed between two elastic rubber bearing members and a cylindrical ring is disposed between the adjacent ends of the two bearing members, which are contained in a housing from which a pin of the ball extends.

It is known that in ball and socket joints having elastic rubber bearing members for the ball there is a danger that the ball may be pressed between two bearing members, and may even force them apart, under the action of a stress acting in a direction transversely to the ball pin. For this reason, it has already been proposed to insert a steel ring between the two bearing members to take up the transverse forces. However, if a steel ring is used, the joint requires lubrication. Since ball and socket joints having bearing members of artificial material normally do not require servicing, i.e. they do not need to be lubricated, the presence of a steel ring has the disadvantage that lubrication becomes necessary even though the bearing members are of artificial material.

Another proposal for eliminating play in the transverse direction of the ball pin consists in arranging the joint or gap between the two bearing members so as not to lie at the equator of the ball, but to one side of it. However, owing to the elasticity of the material of the bearing members, the ball pin is still liable to move too much in the transverse direction.

In order to avoid all the above mentioned disadvantages, and in accordance with the invention the cylindrical ring which is used for taking up the transverse forces in the joint is made of an elastic artificial material, e.g. polyamide. In this way, there is obtained a joint which does not require lubrication even though a cylindrical ring is used. A further considerable improvement in the joint can be obtained by making the ring of such a form that the bearing members are able to move in the longitudinal direction of the ball pin. For this purpose the cylindrical ring may be undulated in the manner of a spring ring, because if wear causes some play to occur between the ball and the bearing members while the joint is in operation, then this play can be compensated by a coil spring which bears, as usual, against the ball. The adjacent ends of the bearing members, which must move towards each other under the action of the spring, can then only move in one direction, namely by compressing the cylindrical ring axially, thus making room for the bearing members.

Figure 1:
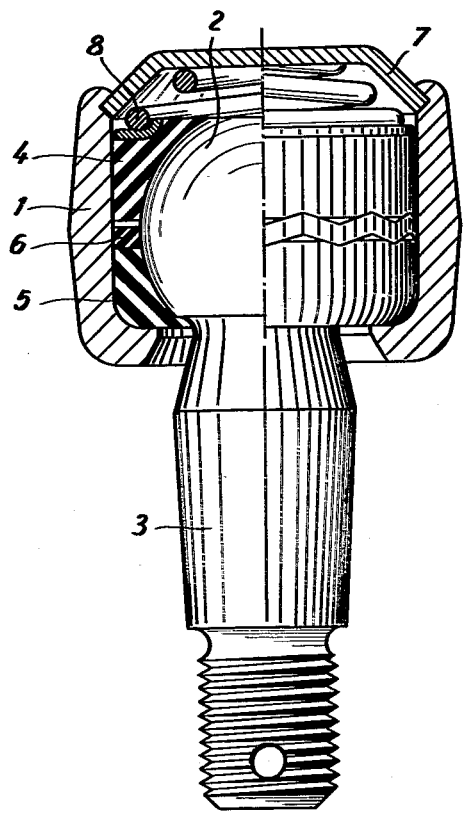
Figure 2:
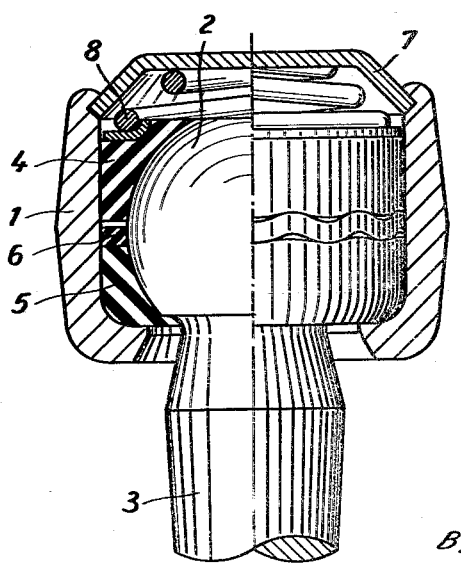

Two embodiments of a ball and socket joint in accordance with the invention are illustrated, by way of example, in the accompanying drawings, in which FIGURE 1 is a part sectional side elevation of the ball and socket joint with a cylindrical ring, and FIGURE 2 is a similar view showing a different ring.

Referring to FIGURE 1, housing for the ball 2 is indicated by 1. The ball has a pin or shank 3 which projects from the housing. Two elastic rubber bearing members 4 and 5 are interposed between the housing 1 and the ball 2. A cylindrical ring 6 of elastic material is disposed between the adjacent end faces of the bearing members 4, 5. The cylindrical ring 6 is of undulated form. When the joint is assembled, i.e. when the cover 7 of the housing is attached, the bearing members 4, 5 are pressed against the cylindrical ring 6. The undulations of the elastic ring are thereby partly straightened out or are pressed into the elastic material of the bearing members 4, 5. The ring 6 is thereby secured against rotation. Furthermore, owing to the fact that the ring is only very slightly flexible in a transverse direction, it is able to take up large transverse forces from the ball pin, so that the pin cannot move laterally to any appreciable extent.

The undulations of the cylindrical ring 6 have an additional function, namely as follows. If, owing to wear, play occurs between the ball 2 and the bearing member 4 while the ball and socket joint is in operation, this play is compensated by the spring 8. The adjacent end faces of the bearing members 4, 5, which must move towards each other under the pressure of the spring, can then only move in one direction, namely in the axial direction, by compressing the cylindrical ring 6 in the axial direction or by pressing the material of the bearing members more firmly into the undulations of the ring 6.

In FIGURE 2, the faces of the cylindrical ring 6 are of zig-zag form. In this case, the material of the bearing members is pressed more or less deeply into the troughs of the zig-zags, so that again the bearing members can move only in the longitudinal direction of the pin 3.

I claim:
1. Ball and socket joint comprising a housing, a ball headed stud disposed with its ball head in said housing, a pair of elastic bearing members, one disposed on each side of the equatorial plane of said ball head, each having a bearing surface in engagement with said ball head, a spring member biasing said bearing members towards each other and against said ball head, said bearing members defining a space therebetween, a resilient spacing ring of relatively hard elastic material such as plastic of the polyamide type disposed in said space between said bearing members and having an inner diameter corresponding to the diameter of said ball head and having an outer diameter corresponding to the inner diameter of said housing, said ring member being undulated in a manner defining elevations and troughs rising and receding in a direction generally axially of said stud in a manner that an elevation on one side is associated with a trough on the other side of said ring, said elastic bearing members having plane surfaces in engagement with the surfaces of said ring defining said elevations and troughs.

2. Ball and socket joint comprising a housing, a ball headed stud disposed with its ball head in said housing, a pair of elastic bearing members, one disposed on each side of the equatorial plane of said ball head, each having a bearing surface in engagement with said ball head, a spring member biasing said bearing members towards each other and against said ball head, said bearing members defining a space therebetween, a resilient spacing ring of relatively hard elastic material such as plastic of the polyamide type disposed in said space between said bearing members and having an inner diameter corresponding to the diameter of said ball head and having an outer diameter corresponding to the inner diameter of said housing, said ring member being undulated in a manner defining elevations and troughs rising and receding in a direction generally axially of said stud in a manner that an elevation on one side is associated with a trough on the other side of said ring, and elastic bearing members having plane surfaces in engagement with the surfaces of said ring defining said elevations and troughs, and said housing having an aperture, a closure member disposed in said aperture, and said spring member extending between said closure member and one said bearing member.

References Cited in the file of this patent

UNITED STATES PATENTS

| | | |
|---|---|---|
| 1,883,882 | Davis | Oct. 25, 1932 |
| 2,181,300 | Flumerfelt | Nov. 28, 1939 |
| 2,708,590 | Latzen | May 17, 1955 |
| 2,754,141 | Latzen | July 10, 1956 |
| 2,854,829 | Porter | Oct. 7, 1958 |

FOREIGN PATENTS

| | | |
|---|---|---|
| E10373 II/63C | Germany | July 26, 1956 |